US006452185B1

(12) United States Patent
Weisenberger et al.

(10) Patent No.: US 6,452,185 B1
(45) Date of Patent: Sep. 17, 2002

(54) METHOD TO CORRECT ENERGY DETERMINATION IN PIXELLATED SCINILLATION DETECTORS

(75) Inventors: Andrew G. Weisenberger; Stanislaw Majewski, both of Grafton, VA (US)

(73) Assignee: Southeastern Universities Research Assn., Newport News, VA (US)

(*) Notice: Subject to any disclaimer, the term of this patent is extended or adjusted under 35 U.S.C. 154(b) by 0 days.

(21) Appl. No.: 09/465,165

(22) Filed: Dec. 16, 1999

(51) Int. Cl.$^7$ .............................. G01T 1/24; G01T 3/06; H01L 25/00; H01L 27/00

(52) U.S. Cl. ............................ 250/370.11; 250/370.1; 250/390.11

(58) Field of Search .................. 250/370.1, 370.11, 250/390.11, 390.12

(56) References Cited

U.S. PATENT DOCUMENTS

| | | | | |
|---|---|---|---|---|
| 5,289,510 A | * | 2/1994 | Mihalezo | 376/258 |
| 5,637,959 A | * | 6/1997 | Kyushima et al. | 313/533 |
| 5,864,141 A | * | 1/1999 | Majewski et al. | 250/363.02 |
| 6,271,525 B1 | * | 8/2001 | Majewski et al. | 250/367 |

* cited by examiner

*Primary Examiner*—Georgia Epps
*Assistant Examiner*—Alicia Harrington

(57) ABSTRACT

A system for improving the resolution of nuclear medicine gamma cameras. A pixellated crystal scintillator is optically connected to position sensitive photomultiplier tubes. Photons incident on the crystal scintillator travel a distance through the crystal that is directly proportional to the energy level of the photon before converting to photoelectrons. The system uses this depth of interaction information to classify the received photons according to their energy levels. Images may then be displayed using information from only those photons that are within the selected energy class.

10 Claims, 6 Drawing Sheets

METHOD TO CORRECT ENERGY DETERMINATION IN PIXELLATED SCINILLATION DETECTORS

BACKGROUND OF THE INVENTION

The invention relates to nuclear medicine, and more particularly relates to scintillation camera systems for use in nuclear medicine studies. Scintillation cameras are used to image the distribution of gamma ray radioactive material within a body part or organ, such as the brain or the breast, for example, for diagnostic purposes. A source of penetrating radiation is administered to the patient, which typically consists of a pharmaceutical tagged with a gamma-ray emitting radiopharmaceutical designed to go to and deposit in the organ or elements of the body under diagnostic examination, such as, in the detection of a tumor. Gamma rays emitted by the radiopharmaceutical are received and detected by the camera, the position of each detected ray event is determined, and the image of the radioactivity distribution in the organ or other body part is constructed by known techniques from an accumulation of events.

Scintillation cameras generally employ one or more optically continuous crystals of thallium activated sodium iodide, NaI (Tl), as the gamma ray energy transducer. Energy of the gamma rays are absorbed in the crystal and are converted to light emissions called scintillation events, each event having an energy proportional to the energy of the absorbed gamma ray. In conventional cameras, light is transmitted from the crystal to an optically clear glass window through a silicone gel interface that fills a thin separation between the glass window and the crystal. The optical window is part of a container that seals the crystal from air and humidity, which would otherwise oxidize the crystal and degrade its optical clarity. An array of photomultiplier tubes (PMT) is optically coupled to the glass window, typically by means of optically coupling grease, in order to transmit light to photocathodes located on the inner surface of the glass entrance face of each photomultiplier tube. Thus, the scintillation light events must pass sequentially from the NaI (Tl) crystal through the silicone gel interface, glass window, silicone grease interface, and photomultiplier glass before striking the photocathodes within the photomultiplier tubes. The photocathodes serve to convert the light to electrons by the photoelectric effect and the electrons are multiplied in the photomultiplier tubes.

Amplified signals generated in photomultiplier tubes in the vicinity of the scintillation event are then mathematically combined by analog or digital means in an attempt to determine the position and the energy of the gamma-ray absorption in the crystal. Accurate determination of the energy level and position of the scintillation event requires that the efficiency of transmission of the scintillation light to the photomultiplier tubes be high. Light dispersion or deflection adversely modifies the ideal light distribution and degrades position determination. If light is reflected back from an interface or undergoes multiple reflections before striking a photocathode, the position information contained in the photomultiplier signals is likely to be compromised. Accurate position determination of scintillation events is essential for high quality resolution.

Because of the number of intervening sources that degrade accurate positioning of scintillation events, such as those listed above, there is a need for an improved method to accurately localize scintillation events and thus improve resolution.

SUMMARY OF THE INVENTION

The present innovative concept provides a means to improve the realized energy resolution of a scintillator based ionizing photon detector by using information of the Locus of the Scintillation (LOS) photons resulting from an absorption within the scintillator of an ionizing photon. The LOS is then used to select ionizing photon interaction events on the bases of the location of their interaction in the scintillator.

A scintillator crystal is mounted to a photomultiplier tube, which is acting as the primary detector. One of several methods is then employed to determine the LOS resulting from the absorption of the gamma ray. The primary detector can be a position sensitive photomultiplier tube (PS-PMT) with crossed wire anodes whose outputs are read simultaneously for each scintillation event, for example. In the last ten y ears, reliable high performance compact position sensitive photomultiplier tubes, such as the Hamamatsu R2486 and the Hamamatsu R3292 have been made available from industry for research.

The broadness of the distribution of the electron cloud on the anode wires is dependent upon the LOS light resulting from the x-rays or gamma rays. Ionizing photons that interact towards the top of the scintillating crystal will produce lower signals, due to absorption in the scintillator, than photons that interact closer to the PMT surface. These photons that interact toward the top of the scintillator crystal give rise to a broader electron cloud distribution on the photocathode which in turn results in a broader distribution at the anode outputs. Conversely, photons with higher energy travel further through the scintillation crystal and interact closer to the PS-PMT. These higher energy photons result in a narrower electron cloud distribution at the anode outputs. By selecting scintillation events based on the size of the electron cloud distribution at the anode outputs one can obtain enhanced energy resolution for the detector by correcting for the depth of interaction dependence.

This method is very useful in nuclear medicine gamma cameras by improving the rejection of scattered radiation that would otherwise contaminate the image. No photon statistics would be lost since all of the interaction events would still be acquired. The only difference in using the present method is that the events would be sorted to different image displays for different energy ranges of the detected gamma rays. This would provide several options to the radiologist reading the image. The clinician would then have the advantage of looking at all the image data as usual and could have specific energy windows enhanced by making use of the depth of interaction information.

BRIEF DESCRIPTION OF THE DRAWINGS

The invention of the present application will now be described in more detail with reference to the preferred embodiment of the method and apparatus, given only by way of example, and with reference to the accompanying drawings, in which.

DETAILED DESCRIPTION OF THE INVENTION

Gamma rays and x-rays are photons that can be detected using a scintillator material coupled to a photomultiplier tube. Scintillator materials have intrinsic energy resolution capabilities that are dependent upon the conversion efficiency of the scintillator material and are also a function of energy of the photons. The photons are detected by first converting to photoelectrons. As the electron passes through the scintillator material some or all of its energy is converted to scintillation optical photons. Different photons will travel at different distances in a crystal before depositing their energy thus giving rise to scintillation light. Scintillators are used in compact medical cameras as pixellated arrays coupled to position sensitive photomultiplier tubes (PS-PMT).

Figure 1:
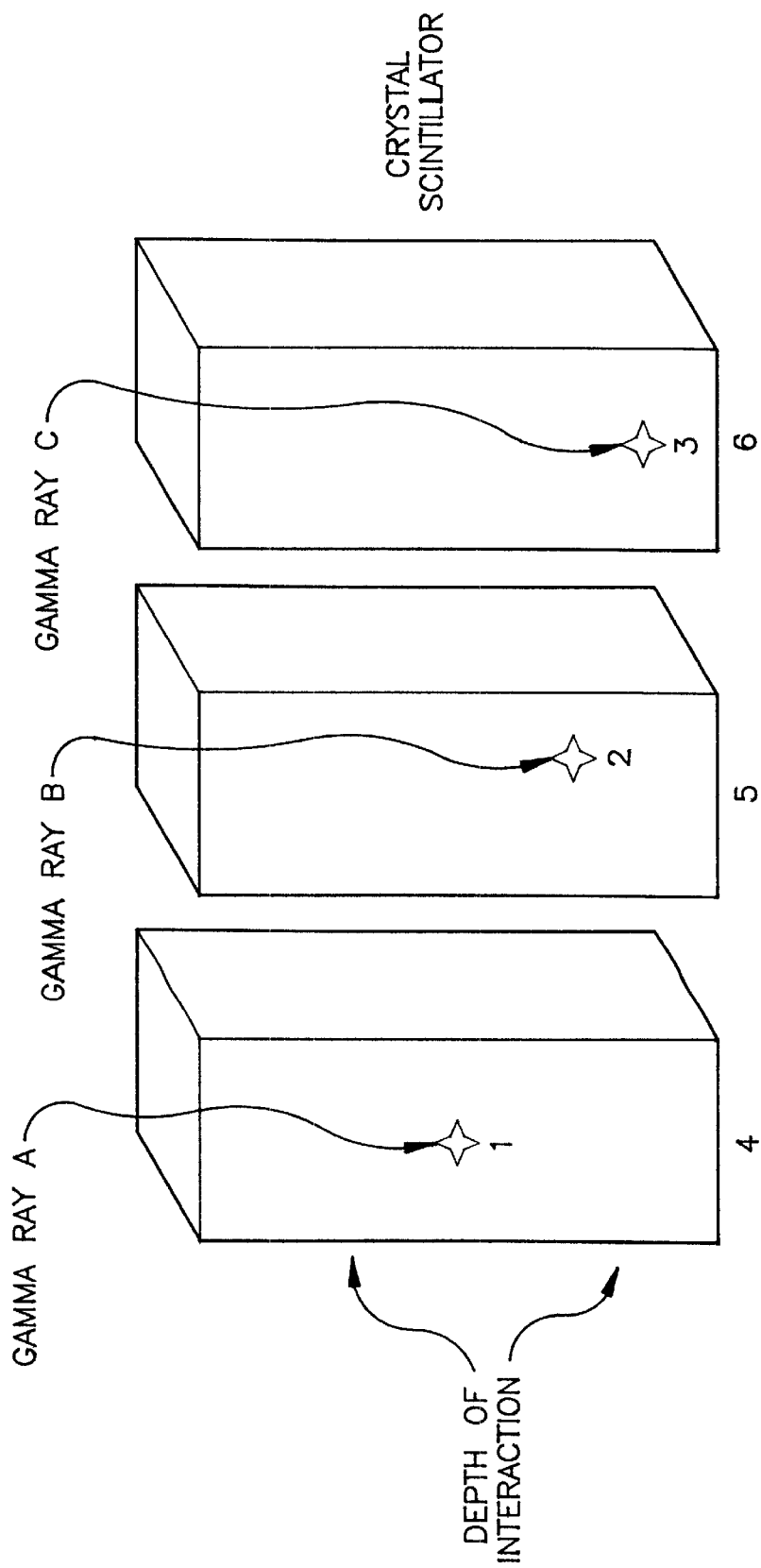
FIG. 1 illustrates the locus of the scintillation (LOS) of three different gamma rays in a pixellated scintillating crystal.

FIG. 1 illustrates three gamma rays with different energy levels interacting with a pixellated crystal scintillator. Crystals 4, 5 and 6 represent three pixels of an array of pixels that are used in a pixellated crystal scintillator. The size of one of the pixels in this example is 1 mm×1 mm×6 mm however, crystal pixels of other sizes may be used without departing from the scope of the invention. Gamma ray A, the weakest of the three represented gamma rays, enters scintillator crystal 4 and travels through the crystal until it reaches point 1. At point 1 an interaction event occurs in which photons from gamma ray A are converted into scintillation optical photons, also referred to as scintillation light. This scintillation light will continue through the scintillation crystal and subsequently interaction with a PS-PMT, which will be discussed in further detail later. Gamma ray B enters crystal 5 and travels further through crystal 5 than gamma ray A traveled through crystal 4. At point 2, gamma ray B is converted to scintillation optical photons. Gamma ray C, the ray with the highest energy level, enters crystal 6 and travels further than both gamma rays A and B, to point 3 before the conversion to scintillation optical photons occurs. FIG. 1 demonstrates that gamma rays with higher amounts of energy travel further through scintillator crystals than gamma rays with lower energy levels. This fact is important to the present invention because the higher level gamma rays are usually the gamma rays of interest to clinicians who are viewing the image. These high-energy gamma rays are therefore the ones that if isolated would provide greater resolution of the specimen being imaged.

Figure 2:
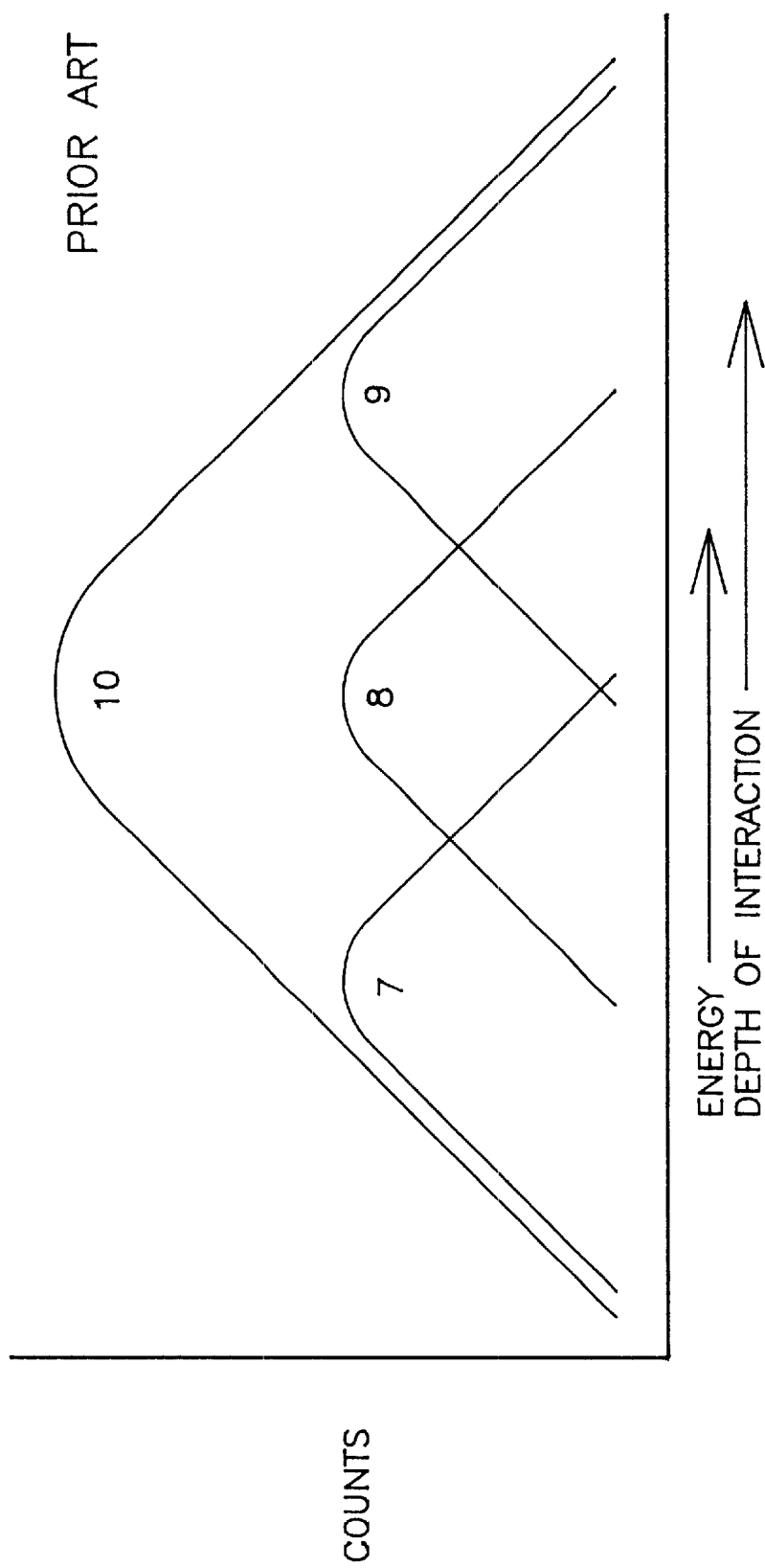
FIG. 2 illustrates the three energy spectrums associated with the three gamma rays of FIG. 1, and the one energy spectrum that is a combination of all three gamma rays which is used in prior art gamma cameras.

FIG. 2 shows energy spectra of gamma rays A, B and C from FIG. 1. Peak 10 represents the energy spectrum of all three gamma rays combined. Peaks 7, 8 and 9 correspond to the to the energy spectra of gamma rays A, B and C, respectively. Peak 10 is the energy spectrum that is used in prior art gamma cameras. Peak 10 includes energy spectra from all received gamma rays, both those that are a result of direct gamma rays from the radiopharmaceutical and those that are a result of reflected gamma rays. Peak 10 will provide a less than ideal image because of the inclusion of unwanted gamma rays.

Figure 3:
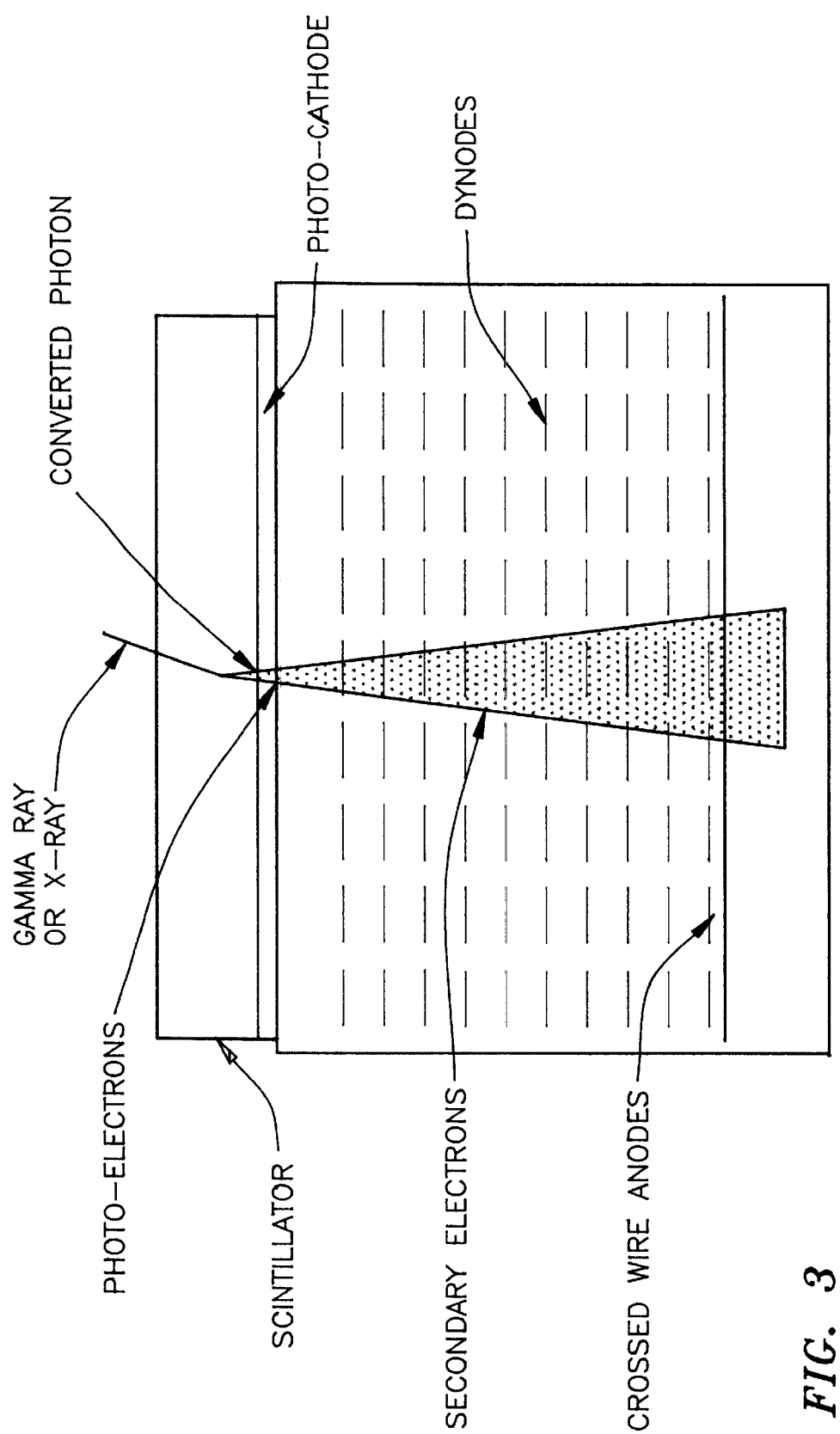
FIG. 3 is a schematic diagram of a position sensitive photomultiplier tube (PS-PMT) with a twelve-stage mesh dynode stack.

FIG. 3 shows a preferred embodiment that includes a scintillator crystal optically connected to a PS-PMT. The PS-PMT includes a photocathode connected to a twelve-stage dynode stack, which is connected to a mesh of crossed wire anodes. Incident gamma rays or x-rays induce scintillation photons in the scintillation crystal. A light photon entering the window and striking the photocathode liberates photoelectrons that are directed through the dynode stages by an electric potential of about 1200 volts. The photoelectrons are accelerated and directed to strike the dynodes resulting in additional electrons, secondary electrons, to be produced and likewise accelerated. At the end of the multiplication stage an electron cloud with a width measured in centimeters reaches the crossed wired anode stage. The broadness of the distribution of the electron cloud on the anode wires is dependent upon the LOS light resulting from the gamma ray or x-ray.

Figure 4:
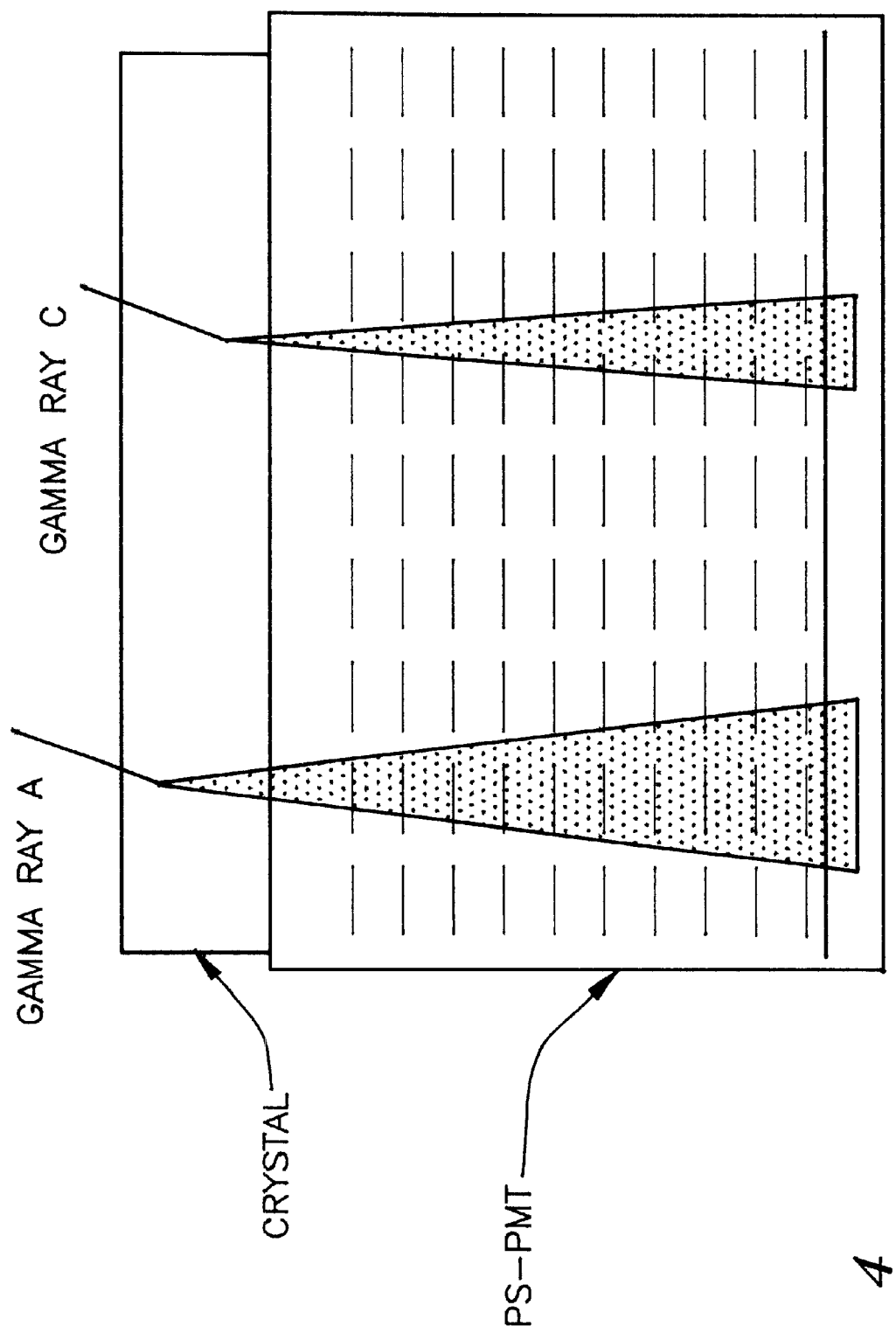
FIG. 4 shows interactions within a PS-PMT of two gamma rays with different energy levels.

FIG. 4 shows the interaction of gamma rays A and C from FIG. 1 upon the scintillator crystal and PS-PMT of FIG. 3. The scintillator crystals of FIGS. 3 and 4 are shown as one solid crystal for clarity purposes. In the preferred embodiment, a pixellated crystal is used to further decrease distortion of the image. However, the inventive concept may be used with a single crystal or plate as well. Gamma ray A represents a weak gamma ray that may have been reflected many times prior to it striking the scintillator crystal. Its incidence near the surface of the crystal scintillator induces scintillation photons, which are received by the photocathode of the PS-PMT. Gamma ray A generates a relatively wide angle of photoelectrons. This angle continues to increase as secondary electrons are generated and multiplied in the PS-PMT. The electron shower reaches the crossed wire anodes at the bottom of the PS-PMT and causes a relatively large electron cloud to be readout by the crossed wire anodes. This broad distribution across the anodes is known as the signature gamma ray A.

Gamma ray C represents a high-energy gamma ray. This gamma ray travels further into the crystal scintillator prior to converting its energy into photoelectrons. The resulting shower of secondary electrons within the PS-PMT has a relatively narrow angle. Although this angle increases as the secondary electrons are multiplied and continue through the PS-PMT, the angle never reaches the broadness of the angle created by gamma ray A. As a result the secondary electron shower incident upon the crossed wire anodes at the bottom of the PS-PMT have a small electron the cloud. The readout or signature of gamma ray C is smaller or narrower than that of gamma ray A. It is these signatures that are used to sort and select different classes of events for display and viewing by the radiologist. In most cases, the radiologist will be interested in viewing those classes of events that have a narrow signature. However, she has the option of viewing classes of events that have broad signatures also.

Figure 5:
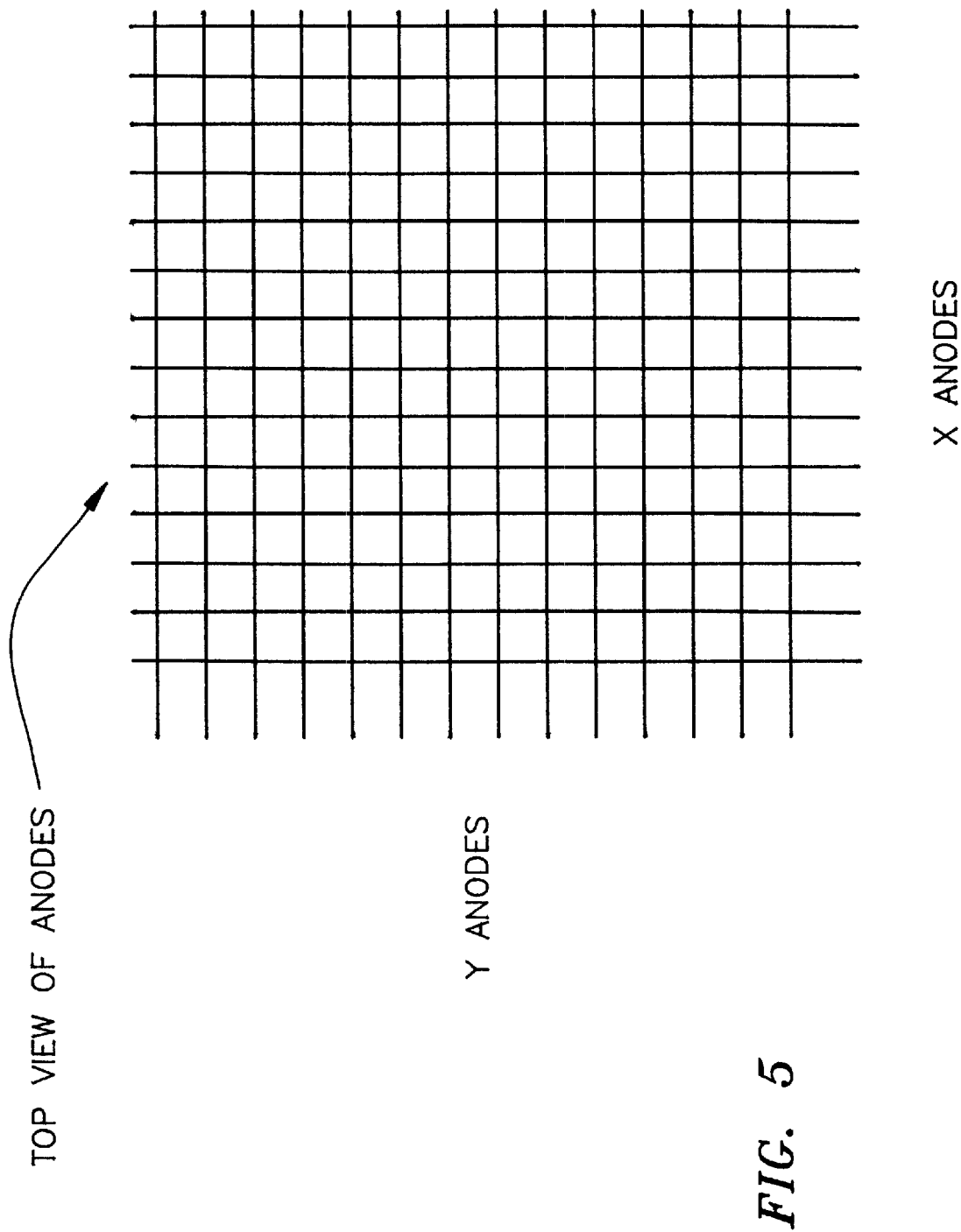
FIG. 5 is a top view of the crossed wire anodes that are used in the PS-PMT's of FIGS. 3 and 4.

FIG. 5 shows a top view of the crossed wire anode mesh that is found at the bottom of the PS-PMT's of FIGS. 3 and 4. A crossed wire anode mesh of 16(x) anodes and 16(y) anodes is shown however, other numbers of X and Y anodes may be used. The anodes in this mesh receive the electron shower generated in the PS-PMT and transmit their outputs for further processing and display. The electronics associated with reading the outputs from the anode mesh may either be analog or digital. Analog circuitry can take advantage of resistor chain readouts, which advantageously require much less space than their digital counterparts. Either type of readout circuitry may be used with the present invention.

In regards to the two PS-PMT's mentioned above, both the model R2486 and R3292 operate in the same way with the size of the detection area, the photocathode, being the only difference. Model R2486 has a three-inch diameter photocathode window and the R3292 has a five-inch diameter photocathode. Both photomultiplier tubes have 12 grid mesh dynode stages and crossed wire anodes, the R2486 has 16(x) and 16(y) anodes whereas the R3292 has 28(x) and 28(y) anodes. The individual anode wires of each axis are separated by 3.75 mm.

Figure 6:
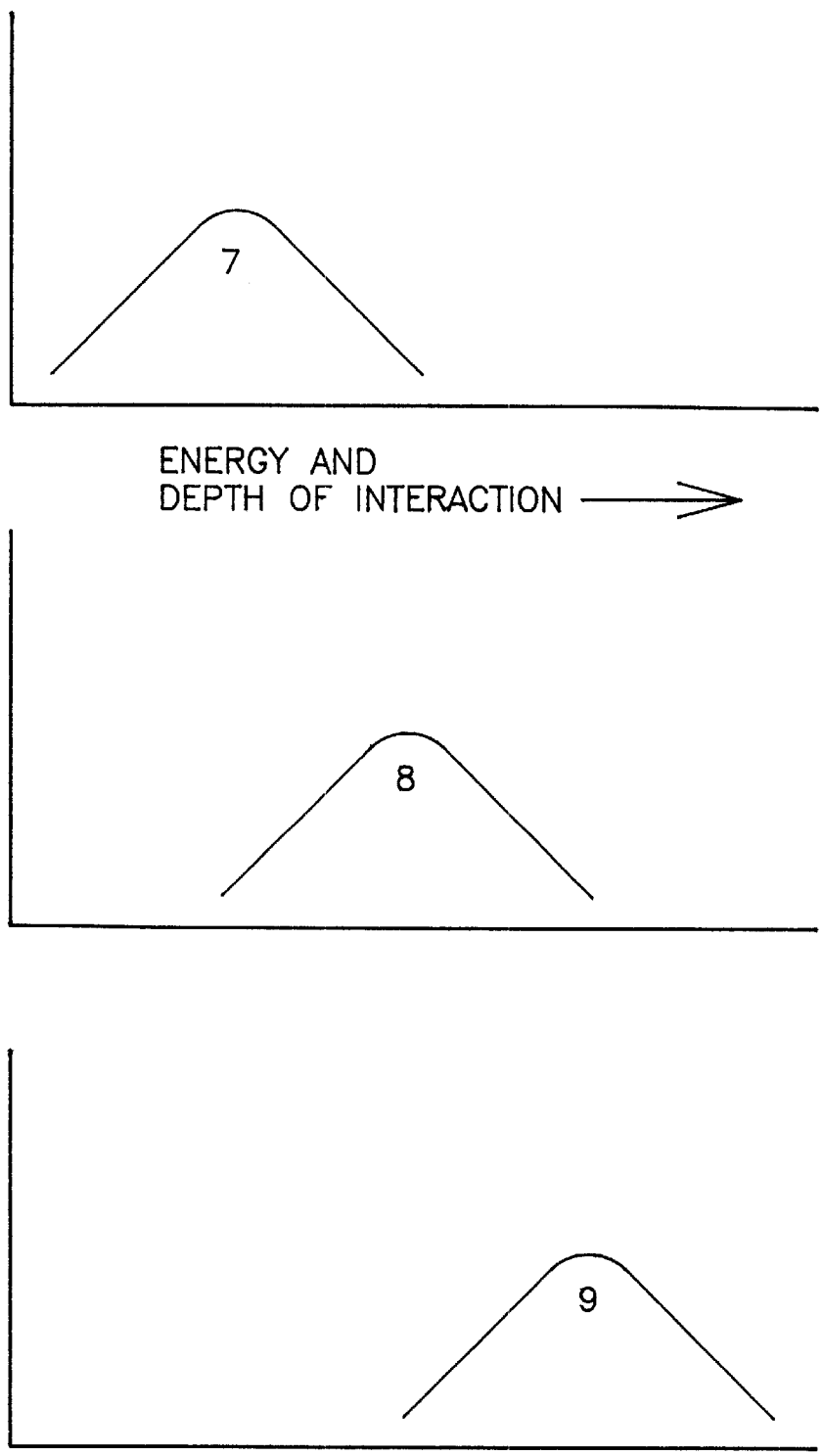
FIG. 6 illustrates different energy spectrums that can be viewed through the use of a preferred embodiment of the present invention.

FIG. 6 represents the individual energy spectra that may be realized as a result of using the present invention. Peaks 7, 8 and 9 correspond to gamma rays A, B and C of FIG. 1. They are the same peaks as peaks 7, 8 and 9 shown in FIG. 2, except that the gamma rays can now be isolated and viewed individually because each belongs to a different class of events. The gamma rays fall into different classes of events because each of the rays contains different amounts of energy. The preferred embodiment allows the user to select the class of event to be viewed and each class may be viewed individually. The top graph in FIG. 6 represents the class of events involving gamma rays with low levels of energy. Those gamma rays that result in an electron cloud with a broad width at the crossed wire anodes. The bottom graph of FIG. 6 represents the class of events involving gamma rays with a high level of energy. Gamma rays in this class travel the furthest in the crystal scintillator and result in an electron clouds at the crossed wire anodes that have narrow distributions. The middle graph in FIG. 6 represents gamma rays with energy levels in between those of the other two classes. The electron cloud distribution associated with gamma rays this class are more broad than the electron clouds of the high energy class and more narrow than those of the low energy class. Allowing the radiologist to view separate classes of events provides images with increased resolution.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

We claim:

1. A method for detecting and displaying an image of a specimen under observation through the use of a nuclear medicine gamma camera wherein the specimen emits radiation, comprising:

obtaining outputs from a crossed wire anode mesh for each light photon event;

classifying each photon event based on a number of anodes that react to the light photon;

selecting one or more classes of events to display; and displaying the selected classes of events.

2. The method of claim 1, wherein the gamma camera comprises a pixellated crystal scintillator.

3. The method of claim 1, wherein the gamma camera comprises position sensitive photomultiplier tubes.

4. The method of claim 1, wherein the radiation emitted from the specimen is gamma rays or x-rays.

5. The method of claim 1, wherein each class of events may contain more than one photon event.

6. A nuclear medicine gamma camera system for detecting and displaying an image of a specimen under observation wherein the specimen emits radiation, the camera comprising:

a crossed wire anode mesh for outputting electrical signals representative of received electron clouds of varying distributions, wherein each electron cloud is a result of a single photon event;

receiving circuitry for receiving anode outputs for each photon event and classifying each photon event based on a number of anodes that react to the photon event;

selecting circuitry for selecting one or more classes of photon events to display; and at least one display for displaying the selected class or classes of photon events.

7. The system of claim 6, wherein the gamma camera comprises a pixellated crystal scintillator.

8. The system of claim 6, wherein the gamma camera comprises position sensitive photomultiplier tubes.

9. The system of claim 6, wherein the radiation emitted from the specimen is gamma rays or x-rays.

10. The system of claim 6, wherein each class of photon events can contain more than one photon event.

* * * * *